US010805076B2

(12) United States Patent
Kambayashi et al.

(10) Patent No.: US 10,805,076 B2
(45) Date of Patent: Oct. 13, 2020

(54) INFORMATION PROCESSING APPARATUS, SERVER APPARATUS, AND COMPUTER PROGRAM PRODUCT

(71) Applicant: KABUSHIKI KAISHA TOSHIBA, Minato-ku (JP)

(72) Inventors: Toru Kambayashi, Kanagawa (JP); Yoshikazu Hanatani, Kanagawa (JP); Atsushi Inoue, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 328 days.

(21) Appl. No.: 15/842,450

(22) Filed: Dec. 14, 2017

(65) Prior Publication Data
US 2018/0115417 A1 Apr. 26, 2018

Related U.S. Application Data

(63) Continuation of application No. 14/556,964, filed on Dec. 1, 2014, now Pat. No. 9,876,640, which is a (Continued)

(30) Foreign Application Priority Data

Jul. 19, 2011 (JP) .................................. 2011-158398

(51) Int. Cl.
*H04L 29/06* (2006.01)
*H04L 9/08* (2006.01)

(52) U.S. Cl.
CPC .......... *H04L 9/0861* (2013.01); *H04L 9/0836* (2013.01); *H04L 9/0891* (2013.01)

(58) Field of Classification Search
CPC . H04L 9/08; H04L 9/06; H04L 9/0816; H04L 9/0819; H04L 9/0861; H04L 9/083; H04L 9/0836; H04L 9/0891; H04L 9/0888
See application file for complete search history.

(56) References Cited

U.S. PATENT DOCUMENTS 6,735,313 B1 5/2004 Bleichenbacher
8,117,463 B2 2/2012 Kim et al.
(Continued)

FOREIGN PATENT DOCUMENTS

| JP | 2008-92514 | 4/2008 |
|---|---|---|
| JP | 2008-135816 | 6/2008 |
| JP | 2009-194640 | 8/2009 |

OTHER PUBLICATIONS

D. Harkins, et al., "The Internet Key Exchange (IKE)", Network Working Group, Request for Comments: 2409, Category: Standards Track, Nov. 1998, 41 pages.
(Continued)

*Primary Examiner* — Yogesh Paliwal
(74) *Attorney, Agent, or Firm* — Oblon, McClelland, Maier & Neustadt, L.L.P.

(57) ABSTRACT

In an embodiment, an information processing apparatus is connected to external apparatuses. The information processing apparatus includes:
a device key storage unit configured to store a device key; a shared key storage unit configured to store one or more shared keys shared by the external apparatuses; a key generating unit configured to generate a media key from the device key and media key blocks; and an updating unit configured to generate the shared keys as generated shared keys, which is updated, based upon the media key and the shared keys stored in the shared key storage unit, and to store the generated shared keys into the shared key storage unit.

4 Claims, 6 Drawing Sheets

Related U.S. Application Data continuation of application No. 13/431,215, filed on Mar. 27, 2012, now Pat. No. 8,929,541.

(56) References Cited

U.S. PATENT DOCUMENTS

| | | |
|---|---|---|
| 2003/0142824 A1 | 7/2003 | Asano |
| 2003/0142826 A1 | 7/2003 | Asano |
| 2005/0071279 A1* | 3/2005 | Asano ............... G06F 21/10 705/57 |
| 2006/0126831 A1* | 6/2006 | Cerruti ............... H04L 9/0841 380/30 |
| 2009/0232314 A1* | 9/2009 | Kato ............... G11B 20/00086 380/278 |
| 2010/0174909 A1 | 7/2010 | Ashdown |

OTHER PUBLICATIONS

C. Kaufman, Ed. "Internet Key Exchange (IKEv2) Protocol", Network Working Group, Request for Comments: 4306, Obsoletes: 2407, 2408, 2409, Category: Standards Track, Dec. 2005, 99 pages.
Japanese Office Action dated Jun. 24, 2014 in corresponding Japanese Patent Application No. 2011-158398, with English translation, (8 pages).

\* cited by examiner

INFORMATION PROCESSING APPARATUS, SERVER APPARATUS, AND COMPUTER PROGRAM PRODUCT

CROSS-REFERENCE TO RELATED APPLICATION

This application is a continuation of U.S. application Ser. No. 14/556,964, filed on Dec. 1, 2014, which is a continuation of U.S. application Ser. No. 13/431,215, filed on Mar. 27, 2012, now U.S. Pat. No. 8,929,541, issued on Jan. 6, 2015, and is based upon and claims the benefit of priority from Japanese Patent Application No. 2011-158398, filed on Jul. 19, 2011, the entire contents of each of which are incorporated herein by reference.

FIELD

Embodiments described herein relate generally to an information processing apparatus, a server apparatus, and a computer program product.

BACKGROUND

A technique of IKE (Internet Key Exchange) has been known as a technique of performing a two-way authentication and sharing an encryption key between two devices (information processing apparatuses). There are basically two methods in this technique; a method based upon a public key cryptosystem, and a method based upon a pre-shared key.

The method based upon the public key cryptosystem is excellent in reducing cost for a key management, but computation cost increases. The method based upon the pre-shared key is excellent in reducing computation cost, but cost for the key management increases. For example, under a situation in which a device is subject to attack, and hence, secret information is leaked, the method based upon the public key cryptosystem can easily reconstruct the system. On the other hand, the method based upon the pre-shared key needs much cost for the reconstruction of the system.

DETAILED DESCRIPTION

Figure 1:
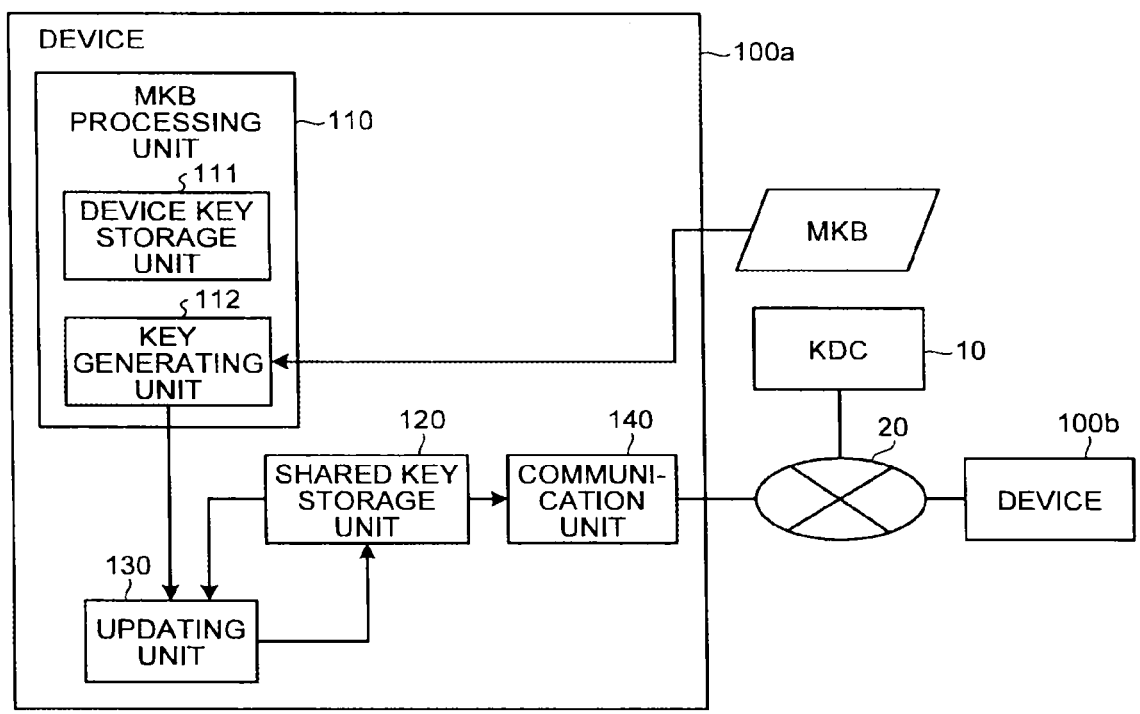
FIG. 1 is a block diagram illustrating a system according to an embodiment.

In an embodiment, an information processing apparatus is connected to external apparatuses. The information processing apparatus includes: a device key storage unit configured to store a device key; a shared key storage unit configured to store one or more shared keys shared by the external apparatus; a key generating unit configured to generate media keys from the device key and media key blocks; and an updating unit configured to generate the shared keys as generated shared keys, which is updated, based upon the media keys and the shared keys stored in the shared key storage unit, and to store the generated shared keys into the shared key storage unit.

Exemplary embodiments of the information processing apparatus will be explained below in detail with reference to the accompanying drawings.

The information processing apparatus according to an embodiment provides an efficient updating function of a pre-shared key with a method based upon a pre-shared key, thereby realizing a reduction in cost for a key management. The information processing apparatus updates all pre-shared keys, retained by a device having no information leakage, by using the updating function of the pre-shared key. The information processing apparatus also sets a device, to which a predetermined updated pre-shared key is assigned, instead of the device having the information leakage. With this, the system can efficiently be reconstructed, even if an attacker illegally obtains the device.

The information processing apparatus (device) according to the present embodiment uses an MKB (media key block) that can derive (generate) a media key, which is suitable for calculating a pre-shared key used in a predetermined key exchange system. The MKB is distributed to each device from a key distribution center (KDC). Each device generates the media key from the MKB and a device key of the device, and generates a new pre-shared key by using the generated media key and the pre-shared key.

A typical device key includes plural sets of secret keys (CS (Complete Sub-tree method, etc.)). The way of constructing the device key is determined according to the employed MKB system.

In the embodiment described below, a device employs one set of device keys and one pre-shared key. The device may employ plural sets of device keys and plural pre-shared keys. Such embodiments described above can be realized by applying the process similar to the process that is performed in the embodiment below to one of the plural sets of device keys and to one of the plural pre-shared keys.

Increasing the number of the key components held by the device makes it possible for plural systems to manage plural pre-shared keys held by one device, whereby more flexible key management can be realized without deteriorating efficiency.

Therefore, it is unnecessary to distribute the pre-shared key to each device from a key management server, which is conventionally performed, upon updating the pre-shared key. Specifically, the KDC only distributes the common MKB to each device. In order to revoke a certain device, the KDC, only re-distributes the common MKB that is updated to revoke the device. Specifically, each device can update the pre-shared key, and the device can easily be revoked, only by the distribution of the MKB by the KDC.

FIG. 1 is a block diagram illustrating one example of the configuration of the system according to the present embodiment. As illustrated in FIG. 1, the system according to the present embodiment includes plural devices 100*a* and 100*b* serving as the information processing apparatus, and a KDC 10 serving as a server apparatus, those of which are connected with network 20. Any network systems such as the Internet can be applied to the network 20.

The devices 100*a* and 100*b* have the same configuration. Therefore, they are merely referred to as a device 100, when it is unnecessary to distinguish the device 100*a* from the device 100b. The device 100 is not limited to two. The system may be configured to include three or more devices 100.

Figure 2:
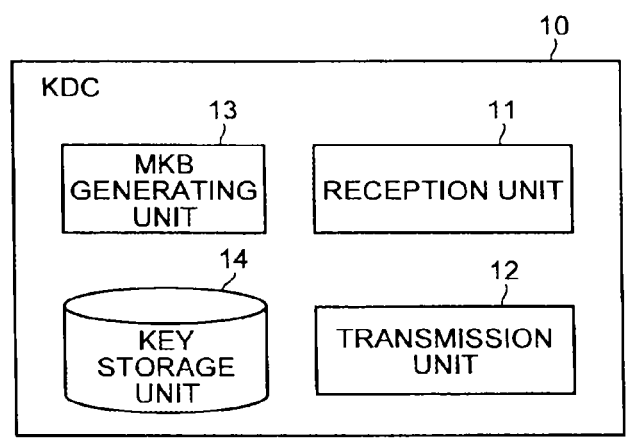
FIG. 2 is a block diagram of a KDC.

The KDC 10 generates the media key, generates the MKB, and distributes the MKB. FIG. 2 is a block diagram illustrating an example of the configuration of the KDC 10. As illustrated in FIG. 2, the KDC 10 includes a reception unit 11, a transmission unit 12, an MKB generating unit 13, and a key storage unit 14.

The reception unit 11 receives various data pieces from an apparatus such as the device 100. The transmission unit 12 transmits various data pieces to the apparatus such as the device 100. For example, the transmission unit 12 transmits the MKB generated by the MKB generating unit 13 to the device 100. The method of inputting the MKB to the device 100 is not limited thereto. For example, the MKB may be input to the device 100 via a storage medium having the MKB stored therein.

The key storage unit 14 stores the device key assigned to each device 100, and a shared key that is shared by each device 100. The key storage unit 14 stores all device keys in the MKB system.

The MKB generating unit 13 generates the MKB by using the device key. Any methods such as CS (Complete Sub-tree method, SD (Subset Difference) method, or LKH (Logical Key Hierarchy) method are applied to the method of generating the MKB.

A public key KP for a signature validation is applied to the KDC 10 as public information. The KDC 10 holds a secret key KS for the public key KP for the signature as secret information that only the KDC 10 knows. A public key and secret key of a digital signature using an elliptic curve can be used as the public key KP and the secret key KS, for example.

Returning to FIG. 1, at least one device key is assigned to each device 100. The KDC 10 gives a bit string x with a predetermined length or more as the media key of the MKB. The x is the bit string selected by the KDC 10. The bit string x is referred to as the media key x below.

After receiving the MKB, each device 100 processes the MKB by the device key assigned to each device 100 so as to acquire the media key x. In this case, when the device 100 is revoked by the MKB, this device 100 cannot correctly process the MKB, resulting in that the device 100 cannot correctly acquire the media key x.

Each device 100 holds a pre-shared key that is shared by the other device that is the communication destination. For example, the device 100a and the device 100b hold a pre-shared key psk.

The device 100 includes an MKB processing unit 110, a shared key storage unit 120, an updating unit 130, and a communication unit 140.

The MKB processing unit 110 stores (memorizes) the device key of the device 100. For example, the MKB processing unit 110 in the device 100a reads the distributed MKB. When the device key of the device 100a is not revoked, the MKB processing unit 110 can generate the media key x from the MKB. The MKB processing unit 110 sends the generated media key x to the updating unit 130.

The updating unit 130 receives the pre-shared key psk, which is shared by the device 100b, from the shared key storage unit 120. The updating unit 130 generates a new pre-shared key psk2 by using the pre-shared key psk and the media key x. The updating unit 130 stores the updated pre-shared key psk2 into the shared key storage unit 120 as a new pre-shared key psk. The updating unit 130 may delete the pre-shared key psk that has been stored before the update from the shared key storage unit 120. The shared key storage unit 120 sends the pre-shared key psk to the communication unit 140, according to need. The communication unit 140 executes an authenticated key exchange protocol to make cryptographic communication.

The MKB processing unit 110 may be configured to confirm the signature of the MBK in order to prevent the forgery of the MKB. In this case, the KDC 10 generates a digital signature corresponding to the MKB by use of the public key KS in order to show the validity of the MKB, and transmits the digital signature together with the MKB. The MKB processing unit 110 stores the public key KP of the KDC 10, and confirms the signature of the MKB by use of the public key KP.

The MKB processing unit 110 may transmit a version number of the MKB to the communication unit 140. The version number of the MKB is data with the order accompanied by the MKB. The communication unit 140 may exchange the version number before performing the key exchange operation with the device 100b. The communication unit 140 does not exchange the key with the device that has an older number of the key version. In this case, the communication unit 140 may perform data exchange to the device 100b so as to confirm whether the shared key can correctly be shared by the device 100b.

The detailed configuration of the MKB processing unit 110 will be described next. As illustrated in FIG. 1, the MKB processing unit 110 includes a device key storage unit 111, and a key generating unit 112.

The device key storage unit 111 stores the device key assigned to the device 100. The key generating unit 112 reads the MKB, processes the MKB with the device key stored in the device key storage unit 111, and generates the media key x. The key generating unit 112 sends the generated media key x to the updating unit 130. In this case, a media key storage unit (not illustrated) may be provided to store the media key x generated by the key generating unit 112 into the media key storage unit. In this case, the media key storage unit may send the media key x to the updating unit 130 according to the request from the updating unit 130.

Figure 3:
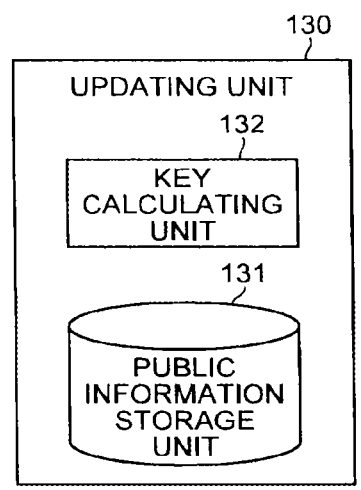
FIG. 3 is a block diagram illustrating an updating unit.

The detailed configuration of the updating unit 130 will be described next. FIG. 3 is a block diagram illustrating an example of the configuration of the updating unit 130. As illustrated in FIG. 3, the updating unit 130 includes a public information storage unit 131, and a key calculating unit 132.

The public information storage unit 131 stores a cryptographic hash function H such as SHA family that is cryptographically secure as a key derivation function.

The key calculating unit 132 calculates the updated pre-shared key psk2 that is updated from the media key x received from the MKB processing unit 110, the pre-shared key psk received from the shared key storage unit 120, and the hash function H received from the public information storage unit 131.

The key derivation function used for calculating the updated pre-shared key is not limited to the hash function H. Any key derivation functions can be applied, so long as they calculate by use of the media key x and the pre-shared key. For example, a pseudorandom function or a one-way function other than the hash function may be used. If the pseudorandom function is used, it is difficult to estimate the updated pre-shared key without the acquisition of the media key x, even in the case of unauthorized release of the pre-shared key.

The hash function H used for calculating the updated pre-shared key through an input of two variables, which are the media key x and the pre-shared key psk, has been described above. However, a function for calculating the shared key through an input of two or more variables may be used.

For example, the updated pre-shared key may be calculated from two media keys and one pre-shared key calculated from two MKBs. When these MKBs are issued from different management systems, the function of updating the pre-shared keys can be divided into two systems. Alternatively, two pre-shared keys may be calculated from one MKB and two pre-shared keys calculated from one MKB. In this way, one management system can collectively manage the pre-shared keys corresponding to plural functions.

The above-mentioned examples are only illustrative. Even in a case where plural MKBs and plural pre-shared keys are used, the calculation can easily be realized by applying the system according to the present embodiment.

The key exchange system by the communication unit 140 can be realized by an authenticated key exchange system using the pre-shared key in the Non-Patent Document 1 of "RFC2409, The Internet Key Exchange (IKE)", D. Harkins et al., [online], November 1998, retrieved from the Internet: <URL: http://www.ietf.org/rfc/rfc2409.txt> or in the Non-Patent Document 2 of "RFC4306, The Internet Key Exchange (IKEv2) Protocol", C. Kaufman, [online], December 2005, retrieved from the Internet: <URL: http://www.ietf.org/rfc/rfc4306.txt>. The key exchange system by the communication unit 140 is not limited to the systems described in the Non-Patent Document 1 above or the Non-Patent Document 2 above. Any systems that can utilize the pre-shared key can be applied.

The communication unit 140 may regard the media key x as the pre-shared key, and perform the authenticated key exchange. In this case, the key exchange system by the communication unit 140 is an anonymous authenticated key exchange system in which the key exchange is made with the authentication based only on the fact that the device is not revoked.

Each of the pre-shared keys is not necessarily set independently. It may have a dependence relationship with a graph structure such as a tree structure. Each of the pre-shared keys may have a dependence relationship calculated from a graph structure used for generating the MKB.

The respective storage units (device key storage unit 111, shared key storage unit 120, public information storage unit 131, key storage unit 14) may be realized by any storage mediums widely used, such as HDD (Hard Disk Drive), an optical disk, a memory card, and RAM (Random Access Memory).

Figure 4:
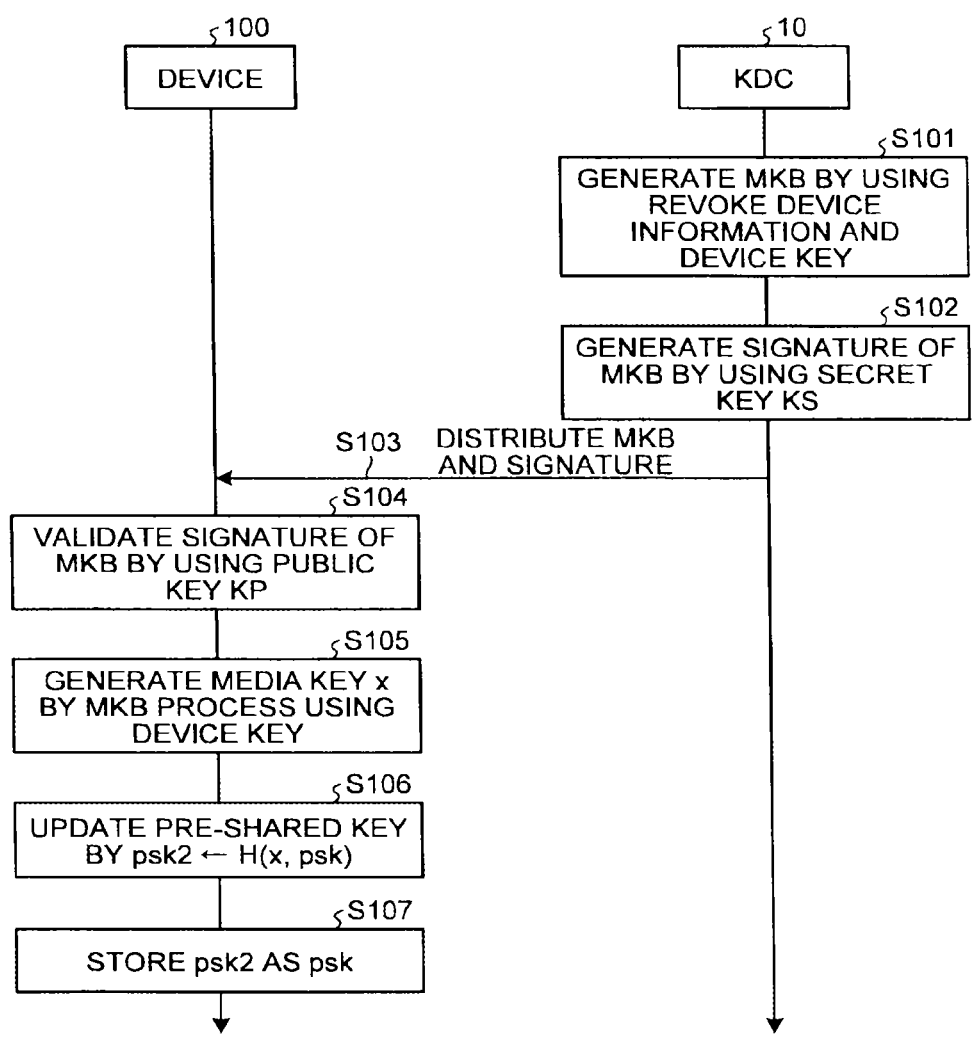
FIG. 4 is a sequence diagram illustrating an updating process in the embodiment.

The updating process of the pre-shared key by the device 100 thus configured according to the present embodiment will be described with reference to FIG. 4. FIG. 4 is a sequence view illustrating the flow for updating the pre-shared key by the device 100. The case where the pre-shared key of the device 100 is updated will be described below as one example.

The MKB generating unit 13 in the KDC 10 firstly generates the MKB by using information (revoke device information) for specifying revoked devices out of the devices 100 and the device keys of the devices 100 (step S101). The KDC 10 then generates a signature of the generated MKB by using the secret key KS (step S102). The transmission unit 12 in the KDC 10 distributes the MKB and the generated signature to each device 100 (step S103).

The MKB processing unit 110 in the device 100 validates the signature of the MKB by using the public key KP (step S104). When the signature does not pass the validation, the following process is stopped.

The key generating unit 112 in the device 100 processes the MKB by using the device key stored in the device key storage unit 111 to generate the media key x (step S105). When the MKB process cannot be executed, the process is stopped, since the device 100 is revoked.

The updating unit 130 in the device 100 generates the updated pre-shared key psk2 that is generated from the hash function H, the media key x, and the pre-shared key psk (step S106).

The shared key storage unit 120 in the device 100 stores the psk2 as psk (step S107).

Similarly, the validation of the signature of the MKB, the generation of the media key x, the generation of the updated pre-shared key, and the storage of the updated pre-shared key are executed in the other device 100.

(Modification 1)

In the modification 1, the KDC 10 manages one graph structure that is formed by combining a graph structure involved with the generation of the MKB and a graph structure involved with the management of the pre-shared key.

Figure 5:
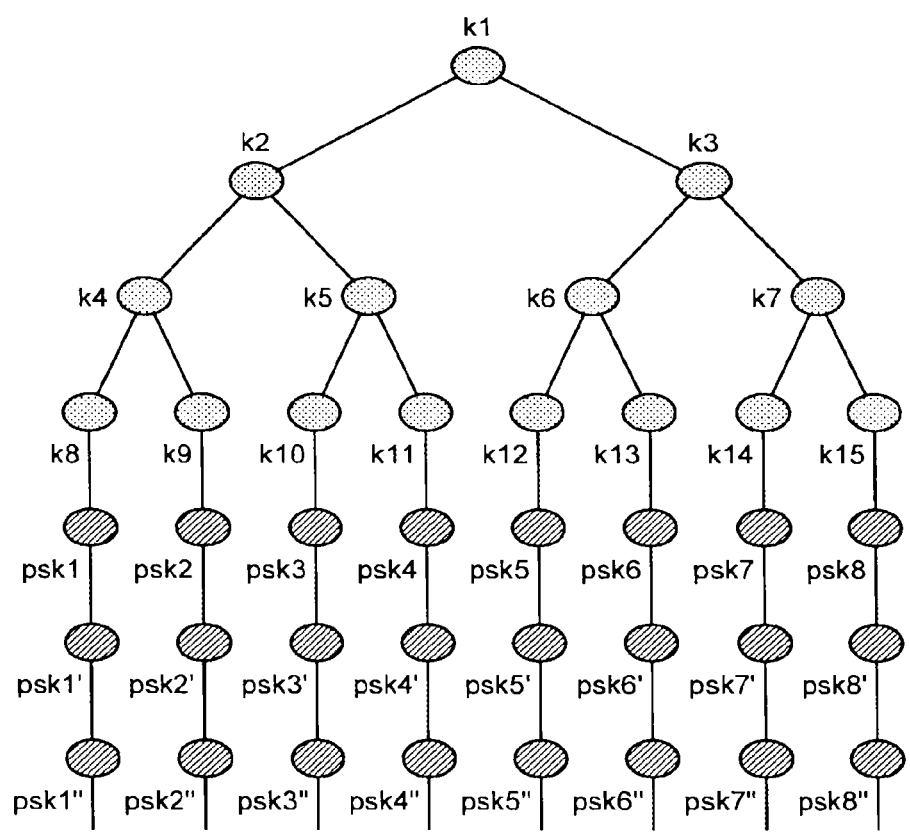
FIG. 5 is a view illustrating a graph structure managing a device and a pre-shared key.

FIG. 5 is a view illustrating one example of the graph structure managing the device and the pre-shared key. The KDC 10 manages the device key (in this example, k1 . . . k15) for generating the MKB by utilizing the tree-structured graph such as CS system or SD system. Specifically, the KDC 10 manages the device key in association with each node (second node) included in the graph. The KDC 10 generates the pre-shared key corresponding to each device 100 from the device key (in this example, k8 . . . k15) corresponding to leaves of the different tree structures for each device 100. The KDC 10 manages the pre-shared key in association with each node (first node) coupled from the leaf of the graph in chains.

The specific process will be described. The KDC 10 holds two types of pseudorandom functions f and g. The KDC 10 randomly generates k1, and then, recursively generates the following device keys, such as k2=f (k1, 0), k3=f (k1, 1) . . . k15=f (k7, 1). Specifically, when the key corresponding to the child node at the left of the tree structure is defined as kj, the key corresponding to the child node at the right is defined as kj+1, and the key corresponding to their parent is defined as ki, the equations of kj=f(ki, 0), and kj+1=f(ki, 1) are established.

Then, the KDC 10 selects mk1, which is a random value, so as to generate the pre-shared keys psk1 . . . psk8, such as psk1=h(mk1, k8), psk2=h(mk1, k9) . . . psk8=h(mk1, k15).

The KDC 10 allows the device 100 having the device key including k8 and the device 100 that makes the authenticated key exchange with the device 100 to hold the psk1. The KDC 10 makes such assignment according to the configuration of the system.

For example, when the device 100 including k8 in the device key and the device 100 including k10 in the device key make the authenticated key exchange, each device 100 generates the pre-shared key psk from psk1 and psk3 by a predetermined method, and use the IKE based upon the pre-shared key, whereby they can make the key exchange.

The pre-shared key is updated by using the common media key x acquired through the process to the MKB as in the above-mentioned embodiment.

With this management, the KDC 10 only stores the device key corresponding to the root of the tree structure and a generation rule of the media key x used for generating the pre-shared key. Therefore, the information that should be managed can safely be reduced.

Figure 6:
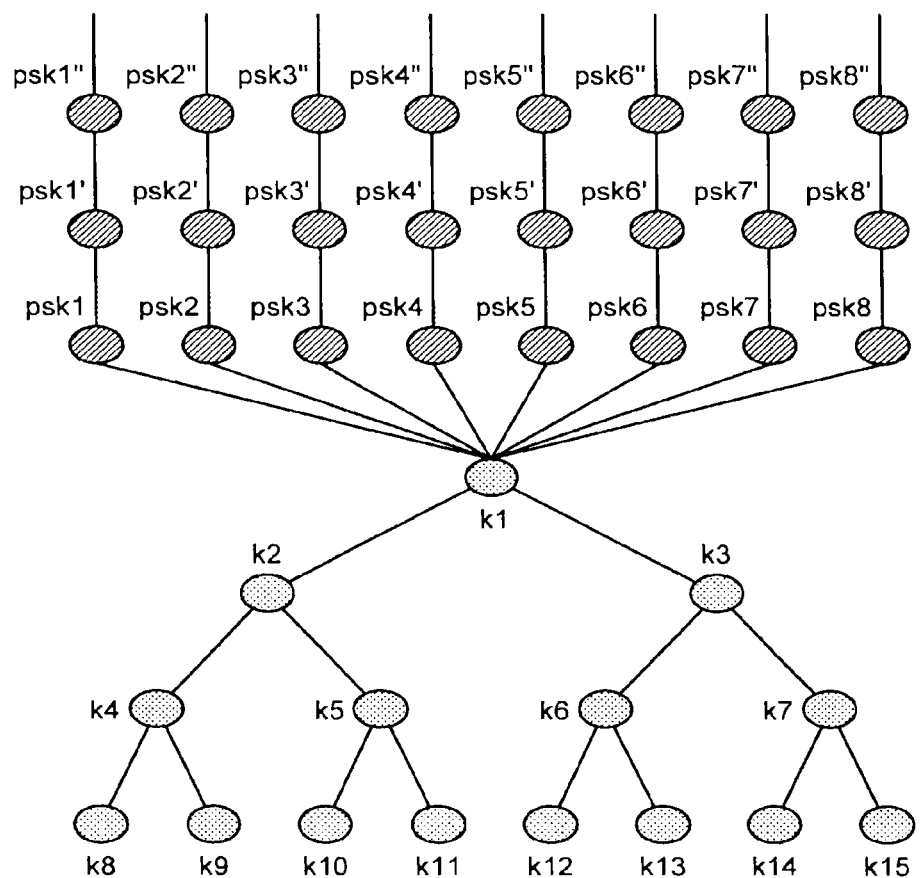
FIG. 6 is a view illustrating a graph structure managing a device and a pre-shared key.

The management in FIG. 5 is only illustrative, and the management may be made with any optional graph structures such as a tree structure illustrated in FIG. 6, for example. The KDC 10 may not send the same MKB to all devices, but send partial information of the MKB according to the device.

Figure 7:
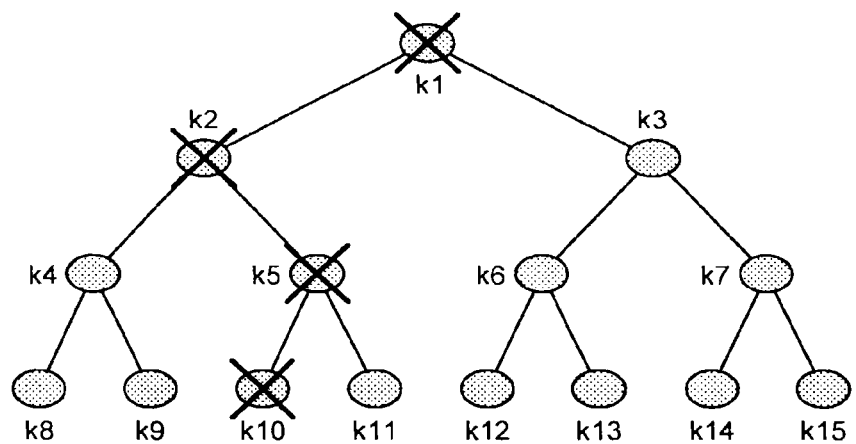
FIG. 7 is a view of a tree structure when the device is revoked.

The specific example will be described with reference to the condition in FIG. 7. FIG. 7 illustrates one example of the tree structure when the device 100 including the device key k10 is revoked. When the MKB is generated in the CS system, the MKB includes three encrypt data, which are encrypt data encrypted with k4, encrypt data encrypted with k11, and encrypt data encrypted with k3. In a normal CS system, the MKB including all of three encrypt data pieces are sent to all devices. However, in this system, each device 100 receives useless data that is not needed for the reconstruction of its device key.

Therefore, the KDC 10 may send the partial information of the MKB according to the device 100 to which the MKB is distributed. For example, only the encrypt data encrypted with k4, out of the encrypt data included in the MKB, is sent to the device 100 including the device key k8. The partial information of the corresponding MKB may be sent according to the inquiry (request) from the device 100.

One example of distributing the partial information of the MKB in the CS system under the condition in FIG. 7 will be described. The device 100 including k13 sends the information including an ID, by which the device 100 can be identified as the device including k13, to the KDC 10. Here, any IDs are used, so long as they can associate the device 100 with the tree structure, such as a character string, a lot number, or a number of a node of a tree structure, assigned to each device 100 beforehand by the KDC 10. After receiving the ID of the device 100 including k13, the KDC 10 sends the encrypt data encrypted with k3 out of encrypt data contained in the MKB as the partial information of the MKB that can correctly be processed by the device 100 including k13.

Another example of distributing the partial information of the MKB in the CS system under the condition in FIG. 7 will be described. The device 100 including k8 sends the information including an ID, by which the device 100 can be identified as the device including k2, to the KDC 10. Here, any IDs are used, so long as they can associate the device 100 with the tree structure, such as a character string, a lot number, or a number of a node of a tree structure, assigned to each device 100 beforehand by the KDC 10. After receiving the ID of the device 100 including k2, the KDC 10 sends the encrypt data encrypted with k4 and the encrypt data encrypted with k11 out of encrypt data contained in the MKB as the partial information of the MKB that can correctly be processed by the device 100 including k2. When the device 100 makes an inquiry of the MKB to the KDC 10, the ID that should be sent to the KDC 10 by the device 100 may be restricted to the information associated with a node at a predetermined height in the tree structure.

Next, one example of a method of sending the MKB will be described. A network certification system called Kerberos certification is widely used. The Kerberos certification will briefly be described below.

In the Kerberos certification, a client who receives the service makes an access to a KDC (hereinafter referred to as KKDC (Kerberos KDC) that executes the Kerberos certification, and reports a server of the service the client intends to enjoy. The client and the KKDC preliminarily share a (symmetrical) key, and the KKDC certifies the client by using this key. The KKDC sends two data pieces called tickets to the client. One is the ticket for the client, and the other is the ticket for the server. The ticket for the KKDC is encrypted by the shared key by the KKDC and the client. The client decodes his/her ticket, and takes out a session key with the server from the decoded data. The client also sends to the server the ticket for the server. The ticket for the server is encrypted by the shared key of the server and the KKDC. The server decodes its ticket, and takes out the session key with the client from the decoded data. From the procedure above, the client and the server can share the session key. When the client requests the service to the server, the server can certify the client by use of the session key.

It is supposed that the server and the client share a shared key psk0. The shared key psk0 is intended to be updated by using the Kerberos certification. It is supposed that the server and the client respectively hold a device key. It is also supposed that the predetermined expiration date is set on the psk0.

The ticket for the Kerberos certification has a field of authorization-data. The KKDC stores in this field of the ticket the MKB that encrypts the media key x, and the expiration date of a key (defined as psk1) that is obtained by updating the psk0. For example, it is supposed that the client makes communication using the psk0 with the server. The client confirms the expiration date of the psk0. If it is valid, the client makes the communication using the psk0.

However, if the psk0 is no longer valid, the client accesses to the KKDC to receive a ticket. The client decodes his/her ticket to take out the MKB, and processes the MKB with the device key of the client. When the client is not revoked, the client acquires the media key x. The client updates the psk0 by using the media key x: $psk1 \leftarrow H(x, psk0)$. The client also sets the new expiration date included in the ticket as the expiration date of the psk1. Then, the client sends to the server a ticket for the server.

After receiving the ticket for the server from the client, the server decodes this ticket to take out the MKB, and processes the MKB with the device key of the server. When the server is not revoked, the server acquires the media key x. The server updates the psk0 by use of the media key x: $psk1 \leftarrow H(x, psk0)$. The server also sets the new expiration date included in the ticket as the expiration date of the psk1.

As described above, the shared key psk0 shared by the client and the server can be updated. By the similar procedure, the shared key of the client and the server can be distributed to the client and the server. In this case, the updating procedure is not performed in both the client and the server, but the obtained media key x is only set as the shared key psk between the client and the server; $psk \leftarrow x$.

As described above, the information processing apparatus according to the present embodiment can realize the authenticated key exchange system that can achieve efficient computation cost and key management cost.

Figure 8:
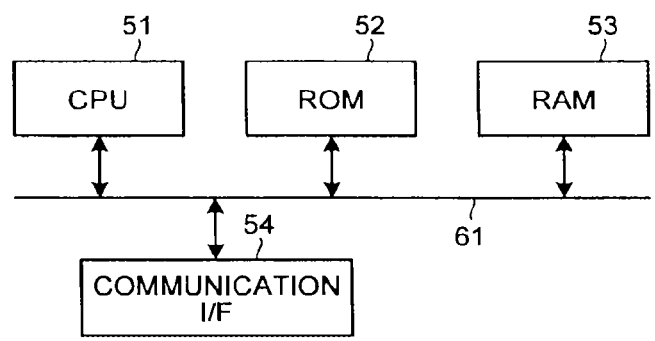
FIG. 8 is a view illustrating a hardware structure of the device according to the embodiment.

The hardware structure of each device (device and KDC) will next be described with reference to FIG. 8. FIG. 8 is an explanatory view illustrating the hardware structure of the apparatus according to the present embodiment.

The apparatus according to the present embodiment includes a control device such as a CPU (Central Processing Unit) 51, a storage device such as a ROM (Read Only Memory) 52 and a RAM (Random Access Memory) 53, an I/F 54 that makes communication through the connection to the network, an external storage device such as HDD (Hard Disk Drive) or CD (Compact Disc) drive device, a display apparatus such as a display device, an input apparatus such as a keyboard or mouse, and a bus 61 that interconnects the respective units. The system has a hardware structure utilizing a general computer.

A program executed in the apparatus according to the present embodiment is recorded on a computer-readable recording medium such as CD-ROM (Compact Disk Read Only Memory), flexible disk (FD), CD-R (Compact Disk Recordable), or DVD (Digital Versatile Disk) in an installable form or executable form, and provided as a computer program product.

The program executed in the apparatus according to the present embodiment may be stored on a computer connected to the network such as the Internet, and provided as being downloaded through the network. The program executed in the apparatus according to the present embodiment may be provided or distributed through the network such as the Internet.

The program according to the present embodiment may be provided as being installed on the ROM beforehand.

The program executed in the information processing apparatus (device) according to the present embodiment has a module structure including the above-mentioned respective units (MKB processing unit, updating unit). The program executed in the server apparatus (KDC) according to the present embodiment has a module structure including the above-mentioned respective units (reception unit, transmission unit, MKB generating unit). As an actual hardware, the CPU 51 (processor) reads and executes the program from the storage medium, whereby the respective units are loaded on the main storage device to be generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus connected to an external apparatus, comprising:
   one or more storage devices that store a device key and a shared key, the shared key being shared by the external apparatus; and
   a processor that generates a media key from the device key and a media key block; wherein, if the shared key stored in the storage devices is no longer valid,
      the processor generates an updated shared key that is obtained by inputting at least the media key and the shared key in a pseudorandom function; and
      stores the updated shared key in the storage devices.

2. The information processing apparatus according to the claim 1, wherein
   the processor deletes the shared key before the update from the storage devices.

3. The information processing apparatus according to the claim 1, wherein
   the storage devices further store the generated media key, wherein
   the processor generates the updated shared key based upon the media key stored in the storage devices and the shared key stored in the storage devices.

4. The information processing apparatus according to the claim 1, wherein
   the storage devices store the device key and the shared key that is set an expiration date; and
   the processor generates the updated shared key if the expiration date of the shared key stored in the storage devices is no longer valid.

* * * * *